United States Patent Office 3,083,186
Patented Mar. 26, 1963

3,083,186
CURING SPIROBI(META-DIOXANE) EPOXIDES WITH POLYCARBOXYLIC ACID ANHYDRIDES IN COMBINATION MODIFIERS CONTAINING ACTIVE HYDROGEN ATOMS
Charles W. McGary, Jr., and Charles T. Patrick, Jr., South Charleston, W. Va., assignors to Union Carbide Corporation, a corporation of New York
No Drawing. Filed Dec. 2, 1958, Ser. No. 782,615
20 Claims. (Cl. 260—75)

This invention relates to compositions comprising curable compositions, partially cured compositions and cured resinous compositions. In a particular aspect, this invention relates to polycarboxylic acid anhydride-spirobi-(meta-dioxane) epoxide compositions which are useful as adhesives, protective coatings, laminates, films and the like, and to processes for their preparation.

This application is a continuation-in-part of copending application Serial No. 747,581, entitled "Epoxide Compositions," by Charles W. McGary, Jr., and Charles T. Patrick, Jr., filed July 10, 1958, and asigned to the same assignee as the instant application.

The curable compositions of this invention range from low-viscosity liquids to solids at room temperature or at higher temperatures. These compositions can be easily handled in such resin-forming operations as coating, laminating, bonding, molding, casting, potting, calendering and the like. They are capable of accepting solid materials, such as fillers and pigments, for providing various effects in physical properties and coloration. With or without such added solid materials, they can be made to fill small intricacies of molds without the necessity of applying high pressures or heating to high temperatures, although such measures can be employed, if desired. The compositions also can be easily spread, brushed, or sprayed by many techniques available in the paint, lacquer and varnish industries for making coatings and finishes. Little, if any, shrinkage occurs in curing the resin. The curable compositions are capable of being accurately shaped by molds having intricate molding surfaces and cured to resins carrying exact details of such molding surfaces. They can also be advantageously employed in the potting of such fragile articles as electronic components.

The partially cured resinous compositions of this invention are obtained as viscous liquids, soft gels and solids. They are capable of being dissolved in a suitable solvent, such as xylene or methyl isobutyl ketone, and applied as a surface coating with a subsequent cure to obtain optimum properties. These partially reacted compositions may also be converted to infusible, insoluble products in molding and casting operations, with or without the addition of other ingredients, such as fillers, e.g., talc, wood flour, alpha cellulose and the like, and pigments, e.g., titanium dioxide, antimony oxide, zinc oxide, carbon black and the like.

The cured compositions of this invention are obtained as hard, tough, solid resins, semi-solid resins and viscous liquid resins. The solid resins can be made as infusible materials with high heat distortion values and capable of supporting heavy loads at temperatures up to 150° C. and above. Resins are also obtainable by this invention which have high room temperature flexural strengths and high room temperature compressive strengths. Moreover, such resins have high flexural strengths at elevated temperatures. These resins are suitable for a variety of applications, wherein strength and load carrying capabilities at elevated temperatures are required in addition to hardness and toughness. The solid resins can also be made with high degrees of hardness and are particularly valuable as durable, wear-resistant and scratch-resistant materials. They can be made as transparent solids, colored solids, and as solids which are capable of being machined and polished. Insolubility in most organic solvents is another property that is characteristic of the high molecular weight resins of this invention.

The curable compositions of this invention comprise admixtures of a polycarboxylic acid anhydride and a spirobi(meta-dioxane) derivative having an epoxide-containing group substituted in the three-position and in the nine-position. The epoxy-containing substituent can contain nitrogen, silicon, phosphorus, sulfur, halogen and the like, in addition to carbon, hydrogen and oxygen. Besides at least one epoxide group in each substituent, other groups can be present such as ether, ester, amide, imide, nitrile, phosphoric acid ester and sulfuric acid ester groups, and the like.

The preferred curable acid anhydride-epoxide systems of this invention can be expressed as compositions comprising (a) a spirobi-(meta-dioxane) epoxide derivative corresponding to the general formula:

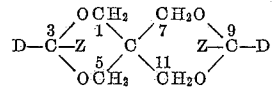

wherein each substituent D is composed of from two to eighteen carbon atoms, one oxygen atom and hydrogen, and wherein any carbocyclic nucleus incorporated in said D is three to six carbon atoms in size, and said oxygen atom is attached to vicinal carbon atoms; and Z is taken from the group consisting of hydrogen and lower alkyl groups containing between one and four carbon atoms, (b) a polycarboxylic acid anhydride having $x$ carboxyl equivalents per epoxy equivalent of said epoxide derivative, and (c) a modifier in an amount having $y$ active hydrogen equivalents per epoxy equivalent of said epoxide derivative; wherein $x$ is a number in the range between about 0.2 and 4.0, $y$ is a number in the range between about 0.0 and 2.0; the sum of $x+y$ being not greater than 4.0 and $x/y$ being at least 1.0.

By "carbocyclic nucleus" is meant a ring structure composed of carbon atoms, such as cyclopropyl, cyclopentyl, cyclohexyl, phenylene and the like.

The proportions of the reactants are preferably expressed in terms of available carboxyl groups or carboxyl equivalent per available epoxy group or epoxy equivalent. Accordingly, by the term "carboxyl equivalent" as herein employed, is meant the number of carboxyl groups contained by an amount of polycarboxylic compound. For example, the "carboxyl equivalent" of a dicarboxylic acid is two. In the case of a dicarboxylic acid anhydride, the term "carboxyl equivalent" is meant to indicate the number of carboxyl groups which would be contained by an amount of the corresponding dicarboxylic acid. Thus, for example, one mole of a dicarboxylic acid anhydride would have a "carboxyl equivalent" of two. Also, as employed herein, the term "epoxy equivalent" is intended to represent the number of epoxy groups,

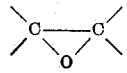

contained by an amount of epoxide compound. Thus, in the diepoxide-polycarboxylic acid anhydride systems, the term $x$ is employed to signify carboxyl equivalents of the anhydride per epoxide equivalent. Since it has been discovered that useful compositions are obtained by employing amounts of polycarboxylic acid anhydride and spirobi(meta-dioxane) epoxide derivatives so as to provide from about 0.2 to 4.0 carboxyl equivalents of anhydride per epoxy equivalent of epoxide derivative, $x$ will be a number in the range from about 0.2 to 4.0. Other useful epoxide-anhydride compositions contain a modifier compound in an amount so as to provide from 0.0 to 2.0 active hydrogen equivalents of a modifier compound per epoxy equivalent of epoxide derivative and, therefore, $y$ will be a number in the range from 0.0 to 2.0. The term "active hydrogen" refers to reactive, acidic type hydrogens such as those contained in carboxylic acid, phenol and alcohol functional groups. The sum of $x+y$ is preferably not greater than 4.0, since it has been observed that products obtained by employing more than about 4.0 reactive groups per epoxy group in the system are oftentimes heterogeneous in nature. In addition, the ration of $x/y$ is at least 1.0 since the polycarboxylic acid anhydride is a major component of the system. It is advantageous to employ spirobi(meta-dioxane) epoxide derivatives and polycarboxylic acid anhydrides in amounts which provide from about 0.6 to about 2.5 carboxyl groups of anhydride per epoxy group of epoxide derivative when it is desirable to produce hard, tough, infusible resins on curing the curable compositions.

The curable compositions of this invention, with or without an active hydrogen modifier compound, can be readily prepared by admixing at room temperature or higher temperatures a polycarboxylic acid anhydride with a spirobi(meta-dioxane) epoxide derivative. It is preferred to agitate the curable composition, for example, by stirring or other suitable means, so as to obtain a homogeneous mixture. When one or more of the composition components is solid or highly viscous, heating is sometimes advantageous in facilitating the formation of a homogeneous mixture. In any event, the application of heat should not be prolonged to the extent that appreciable curing takes place. Catalysts can be added at this point or at any other point prior to curing or not at all, as desired.

The partially cured and cured resinous compositions of this invention are produced from the curable compositions by the application of heat. The polymerization reactions involved proceed smoothly at elevated temperatures without the use of catalysts to produce polymers from the corresponding curable compositions. Catalysts may be used if desired, such as mineral acids, e.g., sulfuric acid, perchloric acid, phosphoric acid, polyphosphoric acid and the like; sulfonic acids, e.g., benzenesulfonic acid, toluenesulfonic acid and the like; metal halide Lewis acids, e.g., stannic chloride, zinc chloride, ferric chloride, aluminum chloride and the like; boron Lewis acid derivatives, e.g., boron trifluoride, boron trifluoride-ether complex, boron trifluoride-piperidine complex, boron trifluoride-monoethylamine complex, boron trifluoride-1,6-hexanediamine complex and the like; metal hydroxides, e.g., sodium hydroxide, potassium hydroxide and the like; organic amines, e.g., alpha-methylbenzyl-dimethylamine, dimethylaminomethylphenol, 2,4,6-tris-(dimethylaminomethyl)phenol, triethylamine, piperidine, trimethylammonium hydroxide and the like; and alkyl titanates, e.g., tetraisopropyl titanate, tetraisobutyl titanate and the like. The amount of catalyst in curable compositions can vary in the range between 0.001 to 5.0 percent by weight based on the weight of the spirobi(meta-dioxane) epoxide derivative.

Uniform dispersions of catalyst in the curable compositions prior to curing have been found to be desirable in order to minimize local curing around catalyst particles. Agitation of the curable compositions as the catalyst is added is sufficient when the catalyst is miscible with the composition. When the two, i.e., catalyst and curable composition, are immiscible, the catalyst can be added as a solution in an organic solvent. Typical solvents for the catalysts include organic ethers, e.g., diethyl ether, propyl ether and the like; organic esters, e.g., methyl acetate, ethyl propionate and the like; organic ketones, e.g., acetone, cyclohexanone and the like; organic alcohols, e.g., methanol, propylene glycol and the like. In addition, water can be used as a solvent for the inorganic acid and inorganic base catalysts.

The curable compositions can be heated to a temperature in the range from about 25° C. to about 250° C., preferably from about 50° C. to about 200° C., for a period of time sufficient to produce hard, infusible resin products. Temperatures higher than 250° C. can be used although some undesirable discoloration may be brought about in the resins thus formed. The time for effecting the complete cure will be governed to an extent on several factors such as the particular polycarboxylic acid anhydride employed, the proportions of spirobi(meta-dioxane) epoxide derivative and anhydride used, the presence or absence of an active hydrogen modifier compound, the temperature for effecting the cure, the presence or absence of a catalyst in the system, and other considerations. In general, the time for effecting the complete cure can vary from several minutes to twenty-four hours and longer, depending upon the correlation of such factors as noted above. The polycarboxylic acid anhydrides derived from the more acidic acids, such as maleic acid, generally cure the fastest.

A higher curing temperature generally will provide a resin in less time than a lower curing temperature. One preferable method is to heat the curable compositions to a temperature within the range from about 50° C. to 150° C. to first partially cure the composition. A temperature from about 100° C. to 200° C. then can be used to complete the cure. However, any one or combination of two or more temperatures within the specified range of 25° C. to 250° C. can be employed, if desired, to effect the full cure. For casting purposes the preferred minimum temperature is that at which the reactants form a uniform melt, whereas for coatings and the preparation of laminates, the use of solvents will allow the use of lower temperatures.

While not wishing to be held to any particular theory or mechanics of reaction, it is believed that in curing, one epoxy group of the spirobi(meta-dioxane) molecule can be difunctional when reacted with polycarboxylic acid anhydrides, such that the equivalent of two carboxyl groups of the anhydride reacts with a single epoxy group to form two ester linkages

interconnecting the epoxide molecule with the anhydride molecules. This reaction can be typified by the general equation:

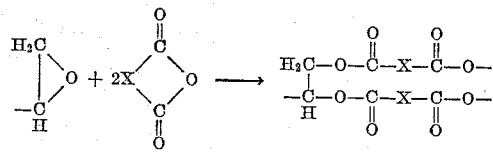

wherein

represent a polycarboxylic acid anhydride. This reaction of polycarboxylic acid anhydrides with spirobi(meta-dioxane) epoxide derivatives is believed to provide crosslinking. It is also believed that resins obtained by using dicarboxylic acid anhydrides having fewer atoms in the shortest chain between the carboxyl groups of the oxy-dicarbonyl group are more rigid than those made with dicarboxylic acid anhydrides having more atoms in said shortest chain. Some degree of crosslinking is believed to be brought about by etherification of epoxy groups of different spirobi(meta-dioxane) molecules during curing. It is also believed that during curing, one epoxy group can be monofunctional when reacted with polyfunctional anhydrides, acids and the like, such that one functional group of the polyfunctional compound reacts with a single epoxy group to form a linkage interconnecting the molecules, and a hydroxyl group attached to said epoxide molecule. A hydroxyl group such as that formed by this reaction and which is attached to the epoxide molecule is believed to be capable of reacting with an epoxy group, a carboxyl group or an oxydicarbonyl group of a polycarboxlic acid anhydride to bring about crosslinking. By the use of active hydrogen modifier compounds in the compositions, rigid resins, flexible resins or resins having intermediate degrees of flexibility or rigidity can be made, as desired. It is believed that compositions containing a modifier compound tend to form more flexible resins than those not containing such modifiers. Also those compositions which contain a modifier having a large number of active hydrogen groups to the molecule form resins which tend to be more rigid than resins formed from compositions which contain a modifier having fewer active hydrogen groups to the molecule. Resins obtained from compositions which contain a difunctional modifier compound having greater numbers of carbon atoms in the shortest chain connecting the active hydrogen groups have been found to have a greater degree of flexibility than resins made from compositions containing a difunctional modifier having fewer atoms in the shortest chain connecting the active hydrogen groups. It is possible, therefore, to produce resins of different degrees of flexibility and rigidity to suit a large variety of particular needs.

The resinous compositions can be regarded as mixtures of polymeric molecules characterized by the presence therein of interconnecting units comprising polyvalent polyfunctional anhydride residues and polyvalent spirobi(meta-dioxane) groups. The valence bonds between the interconnected units are believed to be of the type shown in the above proposed mechanism of reaction.

Spirobi(meta-dioxane) epoxide derivatives can be synthesized readily by the epoxidation of the corresponding 3,9-olefinically unsaturated spirobi(meta-dioxane) compounds. For example,

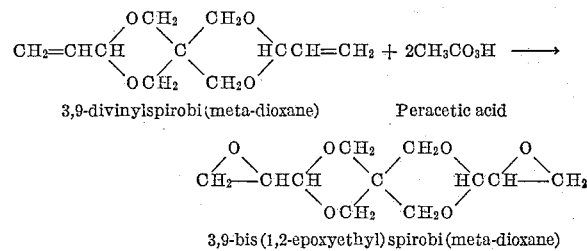

A wide variety of spirobi(meta-dioxane) epoxide derivatives can be employed in the compositions of this invention. One group of these materials can be described by Formula A:

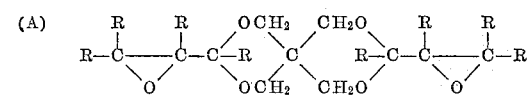

wherein R is hydrogen or lower alkyl groups containing from one to four carbon atoms. Preferred compounds representative of this group include those which have only methyl or ethyl substituents (1) on the epoxide groups, or have no substituents at all (2):

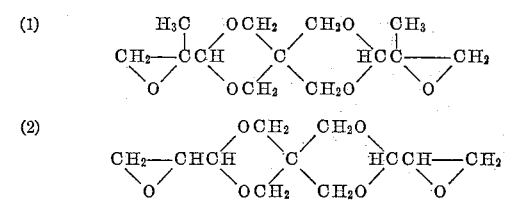

Another group of spirobi(meta-dioxane) epoxide derivatives can be described by Formula B:

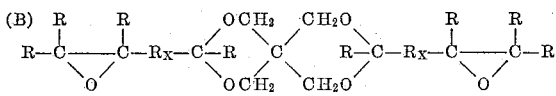

wherein R is hydrogen or lower alkyl groups containing from one to four carbon atoms, and $R_x$ is an alkylene group containing from one to sixteen carbon atoms. Preferred compounds representative of this group include those which are unsubstituted (3), or have one or two lower alkyl substituents (4):

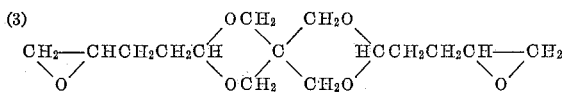

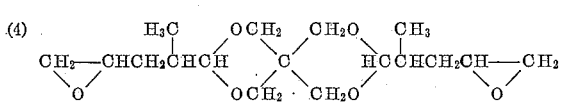

Another group of spirobi(meta-dioxane) epoxide derivatives can be described by Formula C:

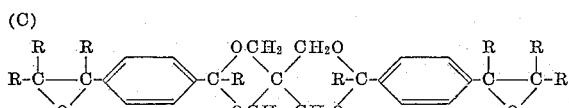

wherein R is hydrogen or lower alkyl groups containing from one to four carbon atoms. Representative of this group of compounds is 3,9-(p-epoxyethylphenyl)spirobi(meta-dioxane).

Another group of spirobi(meta-dioxane) epoxide derivatives can be described by Formula D:

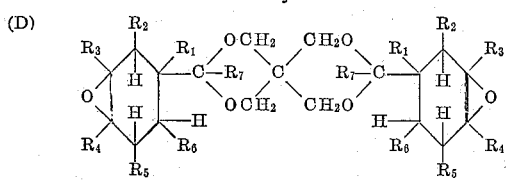

wherein $R_1$ and through $R_7$ are taken from the group consisting of hydrogen and lower alkyl containing from one to four carbon atoms, the total number of carbon atoms in $R_1$ through $R_6$ not exceeding twelve on each ring. Preferred compounds representative of this group include those which are unsubstituted (5), or have one or two lower alkyl substituents (6):

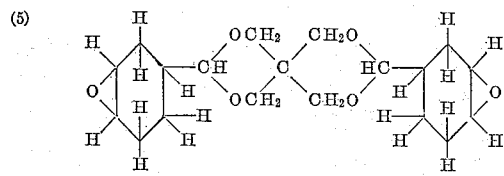

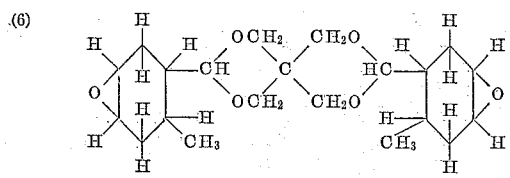

It is not necessary that the epoxy substituent in the three-position be the same as that in the nine-position. Spirobi(meta-dioxane) epoxide derivatives that have dissimilar three- and nine-substituents are as convenient to synthesize as those which have similar substituents.

The 3,9-olefinically unsaturated spirobi(meta-dioxane) derivatives which are epoxidized to produce the starting materials of this invention are synthesized by the condensation of unsaturated aldehydes and ketones or mixtures thereof with pentaerythritol. A more detailed description of the production of 3,9-olefinically unsaturated spirobi(meta-dioxane) compounds, and epoxidation products thereof which are novel in the art, may be found described in co-pending application Serial No. 747,585 by H. R. Guest et al., entitled "Epoxides of Bicyclic Acetals," filed July 10, 1958. Suitable epoxidizing reagents include peracetic acid, acetaldehyde monoperacetate, perbenzoic acid, monoperphthalic acid, pertrichloroacetic acid and the like. Peracetic acid is the preferred oxidizing agent because it is economically prepared in high purity and its reacts smoothly to give high yields of epoxides. The epoxidation reactions are preferably conducted by slowly adding a solution of peracid in an inert solvent such as ethyl acetate, ether or acetone, to the unsaturated spirobi(meta-dioxane) compound at a reaction temperature between 0° C. and 150° C.

The polycarboxylic acid anhydrides which can be used in preparing the novel compositions of this invention include aliphatic, aromatic and cycloaliphatic acid anhydrides. The preferred anhydrides are the dicarboxylic acid anhydrides which include, for example, phthalic anhydride, tetrahydrophthalic anhydride, hexahydrophthalic anhydride, chlorendic anhydride, maleic anhydride, chloromaleic anhydride, dichloromaleic anhydride, glutaric anhydride, adipic anhydride, succinic anhydride, itaconic anhydride, heptylsuccinic anhydride, hexylsuccinic anhydride, methylbutylsuccinic anhydride, methyltetrahydrophthalic anhydride, n-nonenylsuccinic anhydride, octenylsuccinic anhydride, pentenylsuccinic anhydride, propylsuccinic anhydride, citraconic anhydride, 4-nitrophthalic anhydride, 1,2-naphthalic anhydride, 2,3-naphthalic anhydride, 1,8-naphthalic anhydride, tetrabromophthalic anhydride, tetraiodophthalic anhydride. Mixtures of anhydrides, polymeric anhydrides or mixed polymeric anhydrides of sebacic, adipic, pimelic, cyclohexane-1,4-dicarboxylic, terephthalic and isophthalic acids are also useful in preparing the novel compositions. Polycarboxylic acid anhydrides which have melting points below about 250° C. are generally applicable, and those anhydrides possessing melting points below about 200° C. are preferred. Acid dianhydrides such as 1,2,4,5-benzenetetracarboxylic dianhydrides likewise are effective composition components. Of the anhydrides listed, maleic and chlorendic anhydrides are particularly important. Maleic anhydride is inexpensive and has a low melting point, and chlorendic anhydride has a high solubility and the resins containing it are flame-resistant and have high heat distortion properties.

The modifier compounds contemplated for use in the compositions of this invention are those polyfunctional derivatives containing two or more active hydrogen groups, particularly polycarboxylic acids and polyhydric alcohols and phenols. Representative modifier compounds include dihydric alcohols such as ethylene glycol, diethylene glycol, triethylene glycol, tetraethylene glycol, 1,2-propylene glycol, 1,3-propylene glycol, dipropylene glycol, tripropylene glycol, polyoxyethylene glycol, polyoxypropylene glycol, 1,2-butylene glycol, 1,4-butylene glycol, 1,5-pentanediol, 1,6-hexanediol, 2,5-hexanediol, 3-methyl-1,5-pentanediol, 2-methyl-2,5-pentanediol, 3-methyl-2,5-pentanediol, 2,2-diethyl-1,3-propanediol, 2-ethyl-1,3-hexanediol, 2,5-dimethyl-2,5-hexanediol, 1,12-octadecanediol, 1-butene-3,4-diol, 2-butene-1,4-diol, 2-butyne-1,4-diol, 2,5-dimethyl-3-hexyne-2,5-diol, and the like; trihydric alcohols such as glycerol, trimethylolmethane, 1,2,6-hexanetriol, 1,1,1-trimethylolpropane and the like; tetrahydric alcohols such as pentaerythritol, diglycerol and the like; and higher polyhydric alcohols such as pentaglycerol, dipentaerythritol, polyvinyl alcohols and the like; polyhydric compounds prepared by the reaction of epoxides, e.g., 2,2-bis(4-hydroxyphenyl)propane diglycidyl ether, with reactive hydrogen-containing organic compounds, e.g., amines, polycarboxylic acids, polyhydric compounds and the like; polyhydric phenols such as trimethylolphenol, dihydroxytoluenes, resorcinol, bis(4-hydroxyphenyl)-2,2-propane, bis(4-hydroxyphenyl)methane, polyhydric phenolic-formaldehyde condensation products and the like; polycarboxylic acids such as oxalic acid, malonic acid, succinic acid, glutaric acid, adipic acid, pimelic acid, suberic acid, azealic acid, sebacic acid, alkylsuccinic acids, alkenylsuccinic acids, maleic acid, fumaric acid, itaconic acid, citraconic acid, mesaconic acid, glutaconic acid, muconic acid, ethylidenemalonic acid, ispropylidenemalonic acid, allylmalonic acid, 1,2-cyclohexanedicarboxylic acid, 1,4-cyclohexanedicarboxylic acid, 2-carboxy-2-methyl-cyclohexaneacetic acid, phthalic acid, isophthalic acid, terephthalic acid, 1,8-naphthalenedicarboxylic acid, 3-carboxycinnamic acid, 1,2-naphthalenedicarboxylic acid and tetrahydrophthalic acid. Preferred aliphatic dicarboxylic acids include aliphatic dibasic acids containing from five through ten carbon atoms. Other suitable polycarboxylic acid compounds include tricarboxylic acids such as 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid and the like. Modifier compounds which have melting points below about 250° C. are suitable; the modifiers possessing melting points below about 200° C. are preferred.

Other polyfunctional materials may also be incorporated into the curable compositions to modify the properties of the resins obtained by curing. Such polyfunctional materials include other polyepoxides, e.g., polyglycidyl ethers of polyhydric alcohols and phenols, butadiene dioxide, soybean oil epoxide, 3,4-epoxycyclohexylmethyl 3,4-epoxycyclohexanecarboxylate, vinylcyclohexene dioxide and the like, and low molecular weight urea-formaldehyde and phenol-formaldehyde polymers and the like.

The solid resins of this invention which have high distortion values are useful in industrial applications wherein load carrying capabilities at high temperatures is required in addition to hardness and toughness. Such applications include hot fluid carrying conduits, high temperature electrical insulation (e.g., in high-speed aircraft and missiles), tools, dies and molds used at high temperatures, and various laminates, molded articles and surface coatings which are subject to high temperature uses.

Some of the resinous compositions are useful for specialized applications in the field of adhesives. These compositions adhere tenaciously to many types of materials such as wood, cloth, metal, glass, paper and the like.

The compositions of this invention can be dissolved when partially curved in solvents such as xylene, methylisobutyl ketone, butyl acetate, ethyl acetate, toluene, amyl acetate and the like. The proportion of partially cured resin to solvent will depend on various factors such as the particular mixture being cured, the degree or extent of the partial cure, the particular organic solvent employed and other considerations. In general, a solution comprising from about ten to about ninety weight percent of the partially cured resin is satisfactory. The solutions of the compositions can be applied to surfaces and subsequently heat-cured to form hard, tough coatings.

The following description will serve to illustrate particular embodiments of this invention. Barcol hardness values were determined by the use of Barcol Impressor GYZJ-934-1 at a temperature of 25° C. The proportions indicated in each example were calculated on the basis of the purity of the spirobi(meta-dioxane) epoxide derivative as determined by a pyridine hydrochloride method of analysis. Unless otherwise indicated, the examination or description of the resins were conducted at room temperature, i.e., 25° C.

In the examples, the following alphabetic designations are used to identify the respective spirobi(meta-dioxane) epoxide derivatives employed in the reactions:

(A) 3,9-bis(1,2-epoxy-1-methylethyl)spirobi(meta-dioxane)
(B) 3,9-bis(1,2-epoxypropyl)spirobi(meta-dioxane)
(C) 3,9-bis(3,4-epoxybutyl)spirobi(meta-dioxane)

(D) 3,9 - bis(1,2 - epoxy - 1 - ethylpentyl)spirobi(meta-dioxane)
(E) 3,9-bis(3,4-epoxycyclohexyl)spirobi(meta-dioxane)
(F) 3,9-bis(1,2-epoxyethyl)spirobi(meta-dioxane)

EXAMPLES 1 THROUGH 3

2.6 grams of 3,9-bis(1,2-epoxy-1-methylethyl)spirobi-(meta-dioxane) (epoxide A) and 2.6 grams of 3,9-bis-(1,2 - epoxypropyl)spirobi(meta-dioxane) (epoxide B) were each mixed with 1.85 grams of phthalic anhydride in the proportions of 1.25 carboxyl groups per epoxy group. Two mixtures were prepared containing 3,9-bis(1,2-epoxy-1-methylethyl)spirobi(meta-dioxane) (epoxide A). To one 3,9 - bis(1,2-epoxy-1-methylethyl)spirobi(meta-dioxane) (epoxide A) mixture and to the 3,9-bis(1,2-epoxypropyl)spirobi(meta-dioxane) (epoxide B) mixture there was added one drop of a twenty weight percent solution of potassium hydroxide catalyst in ethylene glycol (a catalyst concentration of about 0.16 weight percent based on the weight of diepoxide). Each mixture was heated to 120° C. and maintained at this temperature for about nine to ten hours and then heated for an additional six to nine hours at a temperature of 160° C. The properties of the resins obtained are described in Table I.

Table I

| Ex. No. | Epoxide No. | Gel time, hours, ° C. | Cure, hours, ° C. | Resin description |
|---|---|---|---|---|
| 1 | A[1] | 14, 120; plus 2.75, 160 | 14, 120; 9, 160 | Amber, tough, Barcol, 47. |
| 2 | A | 2, 120 | 9, 120; 6, 160 | Amber, tough, Barcol, 49. |
| 3 | B | 10, 120; plus 1.25, 160 | 10, 120; 9, 160 | Pale amber, tough, Barcol, 47. |

[1] Uncatalyzed.

EXAMPLES 4 THROUGH 7

3,9-bis(1,2-epoxy-1-methylethyl)spirobi(meta-dioxane) (epoxide A) and phthalic anhydride were mixed in the proportions indicated in Table II and to each mixture there was added four drops of a twenty weight percent solution of potassium hydroxide catalyst in ethylene glycol (catalyst concentration of about 0.025 weight percent based on the weight of diepoxide). The resulting mixtures were heated to 120° C. and maintained at that temperature for eighteen hours during which time gels were formed. After postcuring for six hours at 160° C., resins were obtained which had the physical properties described in Table II.

Table II

| Ex. No. | Epoxide A, Grams | Phthalic anhydride, grams | Ratio[1] | Barcol hardness[2] | Heat distortion point, ° C.[3] | Izod impact[4] |
|---|---|---|---|---|---|---|
| 4 | 19.4 | 10.6 | 1.0 | 35 | 117 | 0.2 |
| 5 | 17.8 | 12.2 | 1.25 | 45 | 154 | 0.3 |
| 6 | 16.5 | 13.5 | 1.5 | 50 | 161 | 0.2 |
| 7 | 15.4 | 14.6 | 1.75 | 48 | 163 | 0.2 |

[1] Ratio of carboxyl groups per epoxy group.
[2] Barcol Impressor GYZJ 934-1.
[3] ASTM Method D-648-45T.
[4] ASTM Method D-256-47T.

EXAMPLES 8 THROUGH 11

Various spirobi(meta-dioxane) epoxide derivatives were mixed with phthalic anhydride in the proportions indicated in Table III. Each mixture was heated to a temperature of 120° C. to 160° C. and maintained in this temperature range for the period of time indicated in Table III. The resulting resins were examined at room temperature and the respective properties are described in Table III.

Table III

| Ex. No. | Epoxide | Grams | Phthalic anhydride, grams | Ratio[1] | Cure hours, ° C. | Resin description |
|---|---|---|---|---|---|---|
| 8 | C | 1.97 | 1.11 | 1.5 | 11, 160 | Brown, tough, Barcol, 47. |
| 9 | D | 3.08 | 1.11 | 1.5 | 14, 160 | Amber, brittle. |
| 10 | E | 5.02 | 1.48 | 1.0 | 8, 160 | Pale yellow, tough, Barcol 53 |
| 11 | F | 1.9 | 1.11 | 1.5 | 12, 160 | Yellow, tough, Barcol, 47 |

[1] Ratio of carboxyl groups per epoxy group.

EXAMPLES 12 THROUGH 15

1.36 grams of 3,9-bis(1,2-epoxy-1-methylethyl)spirobi-(meta-dioxane (epoxide A) and various polycarboxylic acid anhydrides were mixed in the proportion of 1.5 carboxyl groups per one epoxy group. Each mixture was heated to a temperature of 120° C. to 160° C. and maintained in this temperature range for the period of time indicated in Table IV. The resulting resins were examined at room temperature and the respective properties are described in Table IV.

Table IV

| Ex. | Anhydride | Grams | Cure, hours, ° C. | Resin description |
|---|---|---|---|---|
| 12 | Tetrahydrophthalic | 1.14 | 20, 160 | Pale yellow, brittle. |
| 13 | Chlorendic | 2.8 | 34, 120; 6, 160 | Black, Barcol, 25. |
| 14 | Succinic | 0.75 | 6.5, 160 | Pale yellow, tough, Barcol, 30. |
| 15 | Polyadipic | 0.95 | 14, 160 | Yellow, brittle. |

EXAMPLES 16 THROUGH 21

1.36 grams of 3,9-bis(1,2-epoxypropyl)spirobi(meta-dioxane) were mixed with various polycarboxylic acid anhydrides and polyols in the proportion of 1.0 carboxyl and 0.3 hydroxyl groups per epoxy group. Each mixture was heated at the temperatures indicated in Table V and the resulting resins were examined at room temperature and the respective properties are described in Table V.

Table V

| Ex. No. | Anhydride | Grams | Polyol | Grams | Cure hours, ° C. | Resin description |
|---|---|---|---|---|---|---|
| 16 | Phthalic | 0.74 | Carbowax 200[1] | 0.33 | 34, 120; 6, 160 | Pale amber, brittle. |
| 17 | Chlorendic | 1.85 | Ethylene glycol | 0.11 | 5, 80; 2, 120; 6, 160 | Do. |
| 18 | Dichloromaleic | 0.85 | Trimethylolethane | 0.13 | 5, 80; 2, 120; 6, 160 | Black, brittle. |
| 19 | Dodecylsuccinic | 1.33 | Pentaerythritol | 0.11 | 34, 120 | Amber, brittle. |
| 20 | Polyadipic | 0.63 | Inositol | 0.10 | 34, 120 | Yellow, brittle. |
| 21 | Glutaric | 0.57 | Trimethylolphenol | 0.15 | 15, 120; 6, 160 | Pale amber, tough |

[1] Tetraethylene glycol.

EXAMPLES 22 THROUGH 25

3,9 - bis(1,2 - epoxypropyl)spirobi(meta-dioxane) (epoxide B), maleic anhydride and ethylene glycol were mixed in the proportions indicated in Table VI. The resulting mixtures were heated to a temperature of 120° C. and maintained at this temperature for the period of time indicated in Table VI, and all resins were postcured for six hours at a temperature of 160° C. The resulting resins were examined at room temperature and the respective properties are described in Table VI.

Table VI

| Ex. No. | Epoxide B, grams | Maleic anhydride, grams | Ethylene glycol, grams | Ratio [1] | Cure at 120° C., hours | Resin description |
|---|---|---|---|---|---|---|
| 22 | 2.72 | 0.33 | 0.05 | 0.3/0.08 | 31 | Amber, hard, brittle. |
| 23 | 2.72 | 0.66 | 0.11 | 0.7/0.3 | 13 | Yellow, tough, Barcol, 30. |
| 24 | 2.72 | 1.64 | 0.05 | 1.7/0.08 | 11 | Brown, tough, Barcol, 45. |
| 25 | 1.36 | 0.98 | 0.1 | 2.0/0.3 | 10 | Amber, tough, Barcol, 45. |

[1] Ratio of carboxy to hydroxyl groups per one epoxy group.

EXAMPLES 26 THROUGH 30

Various spirobi(meta-dioxane) epoxide derivatives were mixed with polycarboxylic acid anhydrides and polyols in the proportion of one carboxyl and 0.3 hydroxy group per epoxy group. The mixtures were heated to a temperature of 120° C. and maintained at this temperature for the period of time indicated in Table VII, and then postcured for six hours at a temperature of 160° C. The resulting resins were examined at room temperature and the respective properties are described in Table VII.

Table VII

| Ex. No. | Epoxide No. | Grams | Anhydride | Grams | Polyol | Grams | 120° C., hours | Resin description |
|---|---|---|---|---|---|---|---|---|
| 26 | B | 1.36 | Succinic | 0.5 | Glycerol | 0.11 | 42 | Amber, Barcol, 35. |
| 27 | C | 1.97 | Phthalic | 0.74 | Bisphenol-A [1] | 0.38 | 3 | Amber, tough, Barcol, 50. |
| 28 | D | 3.09 | Chlorendic | 1.85 | R-108 [2] | 0.25 | 35 | Yellow, brittle. |
| 29 | E | 2.51 | Glutaric | 0.57 | Carbowax 200 [3] | 0.67 | 42 | Yellow, tough. |
| 30 | F | 1.9 | Tetrahydrophthalic | 0.76 | Resorcinol | 0.18 | 11.5 | Yellow, brittle. |

[1] 2,2-(p-hydroxyphenyl)propane.
[2] 2,4,6-trimethylolphenyl allyl ether.
[3] Tetraethylene glycol.

EXAMPLES 31 THROUGH 35

Four mixtures of 1.4 grams of 3,9-bis(1,2-epoxy-1-methylethyl)spirobi(meta-dioxane) (epoxide A) and 1.1 grams of phthalic anhydride were prepared in the proportion of 1.5 carboxyl groups per one epoxy group. To each of the mixtures there was added the amount of catalyst indicated in Table VIII. Each mixture was heated for six to eight hours at a temperature of 120° C. plus six hours of additional heating at a temperature of 160° C. The gel times correspondingly listed in Table VIII indicate the effectiveness of each catalyst.

Table VIII

| Ex. No. | Catalyst | Catalyst, percent [1] | Gel time, hours, ° C. |
|---|---|---|---|
| 31 | KOH [2] | 0.1 | 8, 120; plus 0.67, 160. |
| 32 | DMBA [3] | 0.8 | 3, 120. |
| 33 | H₂SO₄ [4] | 0.1 | 8, 120; plus 0.67, 160. |
| 34 | BF₃-piperidine | 3.0 | 5.5, 120. |
| 35 | None | | No gel after 8, 120; 6, 160. |

[1] Weight percent based on the weight of diepoxide.
[2] Added as a 17.2 weight percent solution in ethylene glycol.
[3] Dimethylbenzylamine.
[4] Added as a 15 weight percent solution in water.

What is claimed is:

1. A curable composition comprising (a) an epoxide derivative corresponding to the general formula:

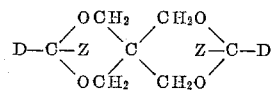

wherein each substituent D is composed of from two to eighteen carbon atoms, one oxygen atom and hydrogen, and said oxygen atom is attached to vicinal carbon atoms, and any carbocyclic nucleus contained in said D is between three and six carbon atoms in size; and Z is selected from the group consisting of hydrogen and lower alkyl groups containing between one and four carbon atoms, (b) a polycarboxylic acid anhydride in an amount having $x$ carboxyl equivalents per epoxy equivalent of epoxide derivatives, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between about 0.2 and 4.0, $y$ is a number in the range between about 0.0 and 2.0, $x$ plus $y$ is a sum not greater than about 4.0 and $x/y$ is at least 1.0.

2. A curable composition comprising (a) 3,9-bis(1,2-epoxy-1-methylethyl)spirobi(meta-dioxane), (b) phthalic anhydride in an amount having $x$ carboxyl equivalents per epoxy equivalent of epoxide derivative, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between about 0.2 and 4.0, $y$ is a number in the range between 0.0 and 2.0, $x$ plus $y$ is a sum not greater than about 4.0 and $x/y$ is at least 1.0.

3. The composition of claim 1 containing a catalytic quantity of a compound selected from the group consisting of mineral acids, sulfonic acids, metal hydroxides, metal halide Lewis acids, boron Lewis acid derivatives, alkyl titanates and amines.

4. A cured composition from the curable composition of claim 3.

5. A curable composition comprising (a) 3,9-bis(1,2-epoxy-1-methylethyl)spirobi(meta - dioxane), (b) tetrahydrophthalic anhydride in an amount having $x$ carboxyl equivalents per epoxy equivalent of epoxide derivative, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between about 0.2 and 4.0, $y$ is a number in the range between 0.0 and 2.0, $x$ plus $y$ is a sum not greater than about 4.0 and $x/y$ is at least 1.0.

6. A curable composition comprising (a) 3,9-bis(1,2-epoxy-1-methylethyl)spirobi(meta - dioxane), (b) chlorendic anhydride in an amount having $x$ carboxyl equivalents per epoxy equivalent of epoxide derivative, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between about 0.2 and 4.0, $y$ is a number in the range between 0.0 and 2.0, $x$ plus $y$ is a sum not greater than about 4.0 and $x/y$ is at least 1.0.

7. A curable composition comprising (a) 3,9-bis(1,2-epoxy-1-methylethyl)spirobi(metal-dioxane), (b) succinic anhydride in an amount having $x$ carboxyl equivalents per epoxy equivalent of epoxide derivative, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between about 0.2 and 4.0, $y$ is a number in the range between 0.0 and 2.0, $x$ plus $y$ is a sum not greater than about 4.0 and $x/y$ is at least 1.0.

8. A curable composition comprising (a) 3,9-bis(1,2-epoxy-1-methylethyl)spirobi(meta-dioxane), (b) polyadipic anhydride in an amount having $x$ carboxyl equivalents per epoxy equivalent of epoxide derivative, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between about 0.2 and 4.0, $y$ is a number in the range between 0.0 and 2.0, $x$ plus $y$ is at least 1.0.

9. A curable composition comprising (a) 3,9-bis(1,2-epoxypropyl)spirobi(meta-dioxane), (b) phthalic anhydride in an amount having $x$ carboxyl equivalents per epoxy equivalent of epoxide derivative, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between about 0.2 and 4.0, $y$ is a number in the range between 0.0 and 2.0, $x$ plus $y$ is a sum not greater than about 4.0 and $x/y$ is at least 1.0.

10. A curable composition comprising (a) 3,9-bis(1,2-epoxypropyl)spirobi(meta-dioxane), (b) succinic anhydride in an amount having $x$ carboxyl equivalents per epoxy equivalent of epoxide derivative, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between about 0.2 and 4.0, $y$ is a number in the range between 0.0 and 2.0, $x$ plus $y$ is a sum not greater than about 4.0 and $x/y$ is at least 1.0.

11. A curable composition comprising (a) 3,9-bis(1,2-epoxypropyl)spirobi(meta-dioxane), (b) maleic anhydride in an amount having $x$ carboxyl equivalents per epoxy equivalent of epoxide derivative, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between about 0.2 and 4.0, $y$ is a number in the range between 0.0 and 2.0, $x$ plus $y$ is a sum not greater than about 4.0 and $x/y$ is at least 1.0.

12. A curable composition comprising (a) 3,9-bis(1,2-epoxypropyl)spirobi(meta-dioxane), (b) chlorendic anhydride in an amount having $x$ carboxyl equivalents per epoxy equivalent of epoxide derivative, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between about 0.2 and 4.0, $y$ is a number in the range between 0.0 and 2.0, $x$ plus $y$ is a sum not greater than about 4.0 and $x/y$ is at least 1.0.

13. A curable composition comprising (a) 3,9-bis(1,2-epoxypropyl)spirobi(meta-dioxane), (b) polyadipic anhydride in an amount having $x$ carboxyl equivalents per epoxy equivalent of epoxide derivative, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between 0.2 and 4.0, $y$ is a number in the range between 0.0 and 2.0, $x$ plus $y$ is a sum not greater than about 4.0 and $x/y$ is at least 1.0.

14. A curable composition comprising (a) 3,9-bis(3,4-epoxybutyl)spirobi(meta-dioxane), (b) phthalic anhydride in an amount having $x$ carboxyl equivalents per epoxy equivalent of epoxide derivative, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between 0.2 and 4.0, $y$ is a number in the range between 0.0 and 2.0, $x$ plus $y$ is a sum not greater than about 4.0 and $x/y$ is at least 1.0.

15. A curable composition comprising (a) 3,9-bis(3,4-epoxycyclohexyl)spirobi(meta-dioxane), (b) phthalic anhydride in an amount having $x$ carboxyl equivalents per epoxy equivalent of epoxide derivative, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between 0.2 and 4.0, $y$ is a number in the range between 0.0 and 2.0, $x$ plus $y$ is a sum not greater than about 4.0 and $x/y$ is at least 1.0.

16. A curable composition comprising (a) 3,9-bis(3,4-epoxycyclohexyl)spirobi(meta-dioxane), (b) glutaric anhydride in an amount having $x$ carboxyl equivalents per epoxy equivalent of epoxide derivative, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between 0.2 and 4.0, $y$ is a number in the range between 0.0 and 2.0, $x$ plus $y$ is a sum not greater than about 4.0 and $x/y$ is at least 1.0.

17. A curable composition comprising (a) 3,9-bis(1,2-epoxyethyl)spirobi(meta-dioxane), (b) phthalic anhydride in an amount having $x$ carboxyl equivalents per epoxy equivalent of epoxide derivative, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between 0.2 and 4.0, $y$ is a number in the range between 0.0 and 2.0, $x$ plus $y$ is a sum not greater than about 4.0 and $x/y$ is at least 1.0.

18. A curable composition comprising (a) 3,9-bis(1,2-epoxyethyl)spirobi(meta-dioxane), (b) tetrahydrophthalic anhydride in an amount having $x$ carboxyl equivalents per epoxy equivalent of epoxide derivative, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between 0.2 and 4.0, $y$ is a number in the range between 0.0 and 2.0, $x$ plus $y$ is a sum not greater than about 4.0 and $x/y$ is at least 1.0.

19. Intermediate reaction products resulting from the partial reaction of a composition comprising (a) a spirobi(meta-dioxane) epoxide derivative corresponding to the general formula:

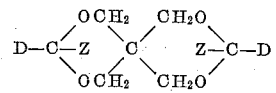

wherein each substituent D is composed of from two to eighteen carbon atoms, one oxygen atom and hydrogen, and said oxygen atom is attached to vicinal carbon atoms, and any carbocyclic nucleus contained in said D is between three and six carbon atoms in size; and Z is selected from the group consisting of hydrogen and lower alkyl groups containing between one and four carbon atoms, (b) a polycarboxylic acid anhydride compound, and (c) a modifier compound selected from the group consisting of polycarboxylic acids and polyhydric alcohols and phenols in an amount having $y$ active hydrogen equivalents per epoxy equivalent of epoxide derivative; wherein $x$ is a number in the range between about 0.2 and 4.0, $y$ is a number in the range between about 0.0 and 2.0, $x$ plus $y$ is a sum not greater than 4.0 and $x/y$ is at least 1.0, said intermediate reaction products being dissolved in an organic solvent, the resulting solution comprising from about 10 to about 90 weight percent of said intermediate reaction products, based on the total weight of said intermediate reaction products and solvent.

20. A process for reducing the gelation period of a curable composition comprising a spirobi(meta-dioxane) epoxide derivative corresponding to the general formula:

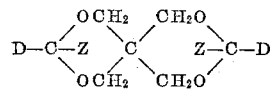

wherein each substitutent D is composed of from two to eighteen carbon atoms, one oxygen atom and hydrogen, and said oxygen atom is attached to vicinal carbon atoms, and any carbocyclic nucleus contained in said D is between three and six carbon atoms in size; and Z is selected from the group consisting of hydrogen and lower alkyl groups containing between one and four carbon atoms, and a polycarboxylic acid anhydride compound in an amount having from about 0.4 to 4.0 carboxyl equivalents per epoxy equivalent of spirobi(meta-dioxane) derivative which comprises heating at reaction temperature said curable composition in the presence of from about 0.001 to 5.0 weight percent, based on the weight of spirobi-(meta-dioxane) epoxide derivative, of a catalyst selected from the group consisting of mineral acids, sulfonic acids, metal halide Lewis acids, boron Lewis acid derivatives, metal hydroxides, alkyl titanates and amines, for a period of time sufficient to produce gelation.

References Cited in the file of this patent
UNITED STATES PATENTS

| | | |
|---|---|---|
| 2,801,232 | Suen et al. | July 30, 1957 |
| 2,884,408 | Phillips et al. | Apr. 28, 1959 |
| 2,890,196 | Phillips et al. | June 9, 1959 |
| 2,895,962 | Fischer | July 21, 1959 |
| 2,918,444 | Phillips et al. | Dec. 22, 1959 |
| 2,921,925 | Phillips et al. | Jan. 19, 1960 |
| 2,947,717 | Belanger et al. | Aug. 2, 1960 |
| 3,023,222 | Guest et al. | Feb. 27, 1962 |